United States Patent [19]

Masetto

[11] Patent Number: 5,296,103

[45] Date of Patent: Mar. 22, 1994

[54] METHOD FOR THE FRACTIONAL DISTILLATION OF LIQUID MIXTURES AND APPARATUS FOR CARRYING OUT THE METHOD

[75] Inventor: Gianclaudio Masetto, Milan, Italy

[73] Assignee: T.I.I. Tecnologie Industriali Innovative S.n.c. di Rosa Corigliano e.C., Milan, Italy

[21] Appl. No.: 882,031

[22] Filed: May 13, 1992

[30] Foreign Application Priority Data

May 14, 1991 [IT] Italy .................. MI 91A001320

[51] Int. Cl.5 .................................. B01D 3/42
[52] U.S. Cl. .................................. 203/1; 55/233;
159/28.5; 159/44; 159/47.1; 202/158; 202/160;
202/179; 202/185.6; 202/189; 203/2; 203/87;
203/DIG. 18; 261/152; 261/DIG. 72
[58] Field of Search ............... 203/1, 87, 2, DIG. 18;
159/47.1, DIG. 23, 28.5, 43.1, 44; 202/179,
185.4, 185.6, 158, 189, 160, 182, 237; 261/DIG.
72, 75, 96, 97, 156, 152; 55/233

[56] References Cited

U.S. PATENT DOCUMENTS

| 769,379 | 9/1904 | Herold | 159/28.5 |
|---|---|---|---|
| 1,265,863 | 5/1918 | Abbott, Jr. | 159/28.5 |
| 1,890,152 | 12/1932 | Hills | 159/28.5 |
| 2,608,387 | 8/1952 | Randall | 159/28.5 |
| 4,828,660 | 5/1989 | Clarr et al. | 202/158 |

FOREIGN PATENT DOCUMENTS

| 1419190 | 7/1968 | Fed. Rep. of Germany . | |
| 2848041 | 2/1980 | Fed. Rep. of Germany . | |
| 0730375 | 5/1955 | United Kingdom | 159/28.5 |
| 0748562 | 5/1956 | United Kingdom | 159/285 |
| 0801242 | 9/1958 | United Kingdom | 159/28.5 |
| 0942846 | 11/1963 | United Kingdom | 159/28.5 |
| 0970722 | 9/1964 | United Kingdom | 159/28.5 |

OTHER PUBLICATIONS

Chemical Engineering, vol. 69, No. 18, Sep. 3, 1962, N.Y., p. 150-R. C. Oliver et al, "Temperature-Compensated Distillation Column".

Primary Examiner—Virginia Manoharan
Attorney, Agent, or Firm—Sughrue, Mion, Zinn, Macpeak & Seas

[57] ABSTRACT

A method for the fractional distillation of a mixture of at least two compounds with different boiling points, a rising flow of vapor is brought into intimate contact with a descending flow of liquid obtained within a column (1) by the partial condensation of the flow of vapor itself by heat exchange with a cooled surface which extends through a filling (37).

7 Claims, 5 Drawing Sheets

METHOD FOR THE FRACTIONAL DISTILLATION OF LIQUID MIXTURES AND APPARATUS FOR CARRYING OUT THE METHOD

BACKGROUND OF THE INVENTION

The present invention relates to a method and apparatus for the fractional distillation of a mixture including at least two compounds with different boiling points including the steps of:

providing a column including a filling, determining a rising flow of vapor and a descending flow of liquid of the said mixture in the column.

As is known, the term distillation indicates a chemical engineering operation in which a mixture including two or more substances with different boiling points is fractionated into individual components.

This fractionation occurs by the bringing into contact, in apparatus known as a distillation column, of a vapor phase at its dew point and a liquid at the temperature at which is starts to vapor: during this contact there is a simultaneous exchange of material and heat whereby the more volatile component transfers from the liquid phase to the vapor phase by evaporation while the less volatile component transfers from the vapour phase to the liquid phase by condensation.

In distillation operations the basic requirement to be satisfied is that of achieving the highest possible efficiency in the fractionation.

For this purpose the attempt is made, in distillation columns, to achieve the most intimate mixing possible between the liquid phase and the vapor phase, whether discontinuously in plate columns or continuously in filled columns.

In order further to increase the efficiency of fractionation and to obtain pure compounds, it is common practice to introduce the vapor phase and the liquid phase into a reflux column.

The vapor reflux is obtained by the re-evaporation of part of the liquid phase leaving the column while the liquid reflux is obtained by the condensation of all the vapor phase leaving the column and the reintroduction of a proportion of this condensate into the column itself.

It is exactly the control of the reflux quantities and the temperature of the liquid reflux phase that enables the operation of the column to be regulated to give the maximum efficiency of fractionation and very pure products.

In distillation columns universally used, the control of the working conditions in each section of the column is effected by changing the value of the reflux quantities and the temperature of the liquid reflux phase, these being the "local" working conditions dependent on the liquid-vapor equilibrium conditions in the column as a whole.

The distillation columns used in known fractionation methods thus have the disadvantage of not being very flexible and being delicate and difficult to regulate.

In filled columns in particular, each significant variation in the quality and composition of the mixture to be fractionated causes repercussions on the liquid-vapor equilibrium conditions existing in the column with the result that the products obtained may not be of the desired degree of purity.

On the other hand the use of plate columns, which are less sensitive to variations in the composition of the supply, involve a consideration increase in the dimensions of the column in order to give the same separation yield, as well as an increase in the hold-up of the liquid in the column with a related increase in the time necessary to bring the column itself to its running conditions.

The technical problem at the root of the present invention is thus to devise a method and apparatus for fractionating a mixture including at least two components with different boiling points by distillation which are simple to control and such as to ensure high efficiency in the separation of the constituents of the mixture.

SUMMARY OF THE INVENTION

The technical problem set out above is resolved by a method of the type indicated above which is characterised in that the liquid reflux is achieved within the column itself by partial condensation of the vapor flow by heat exchange with a cooled surface extending through the filling.

In order to carry out the said method, the present invention provides a distillation column of the type including:

a tubular body having a top end and a bottom end at opposite ends and including a filling;

a boiler in fluid communication with the bottom end, the column being characterized in that it includes a condenser extending throughout the entire length of the filling.

To advantage, with the said method and column, it is possible to control the liquid-vapor equilibrium conditions substantially in each section of the column, from the exterior, by local regulation of the temperature and local generation of the required liquid reflux fraction by virtue of the cooled surface.

As will become clearer from the description below, this condensation is carried out by introducing a suitable coolant fluid into the condenser in heat exchange with the filling of the column itself.

The structural and functional characteristics of the column also allow the method of the invention to be applied to the separation of mixtures containing one or more essential oils which, as is known, are organic substances which are sensitive to heat and thus are difficult to separate by distillation, by operation under vacuum and at a low temperature. In this case, the method of the invention also enables the advantageous effect of rectification of the mixture to be achieved, giving a very pure distillate.

BRIEF DESCRIPTION OF THE DRAWINGS

Further characteristics and advantages of the method will become more apparent from the description of one embodiment thereof, given by way of non-limiting example, with reference to the appended drawings. In these drawings.

DETAILED DESCRIPTION OF THE INVENTION

Figure 1:
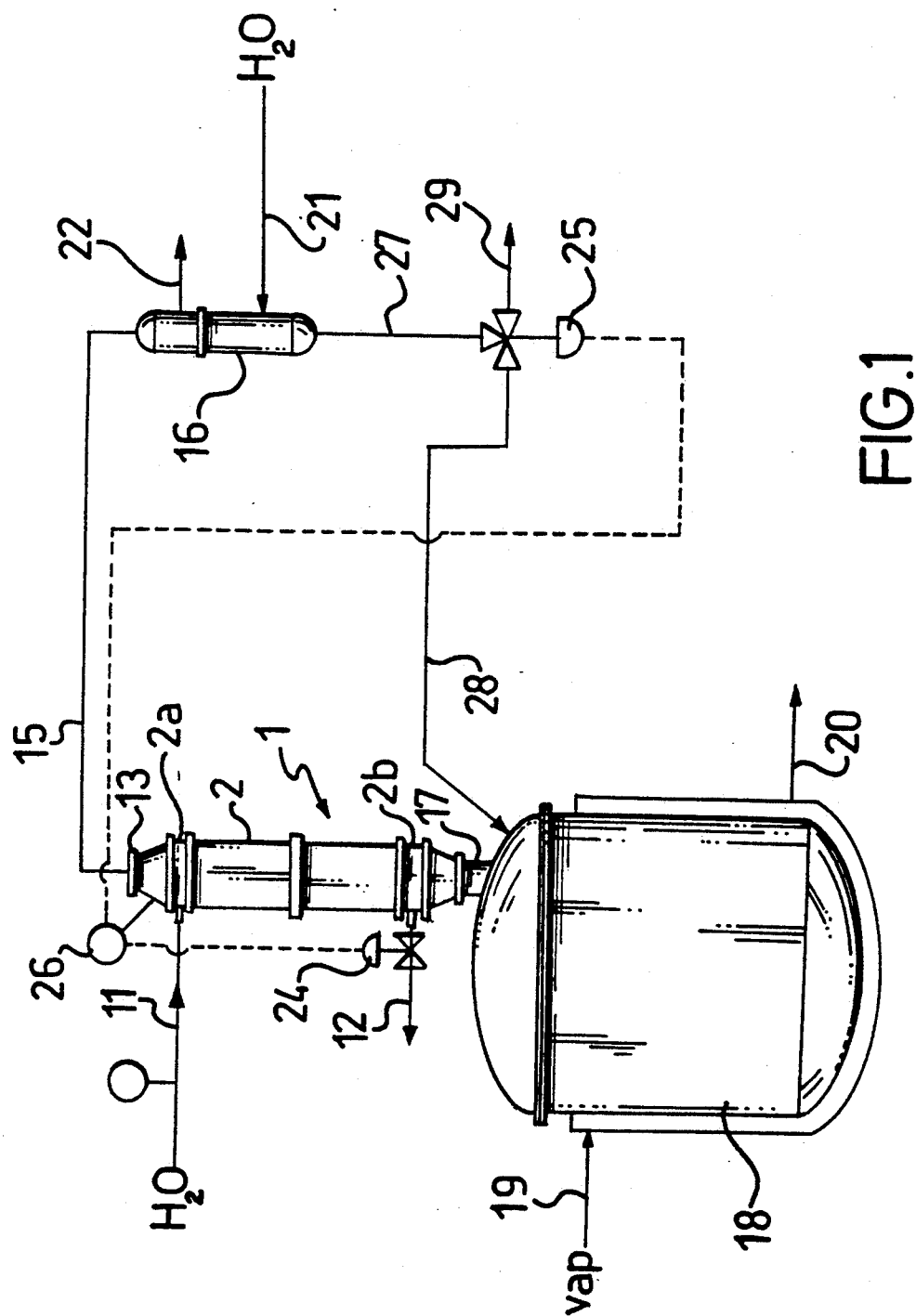
FIG. 1 illustrates schematically a plant and its apparatus for carrying out the method of the present invention.
Figure 2:
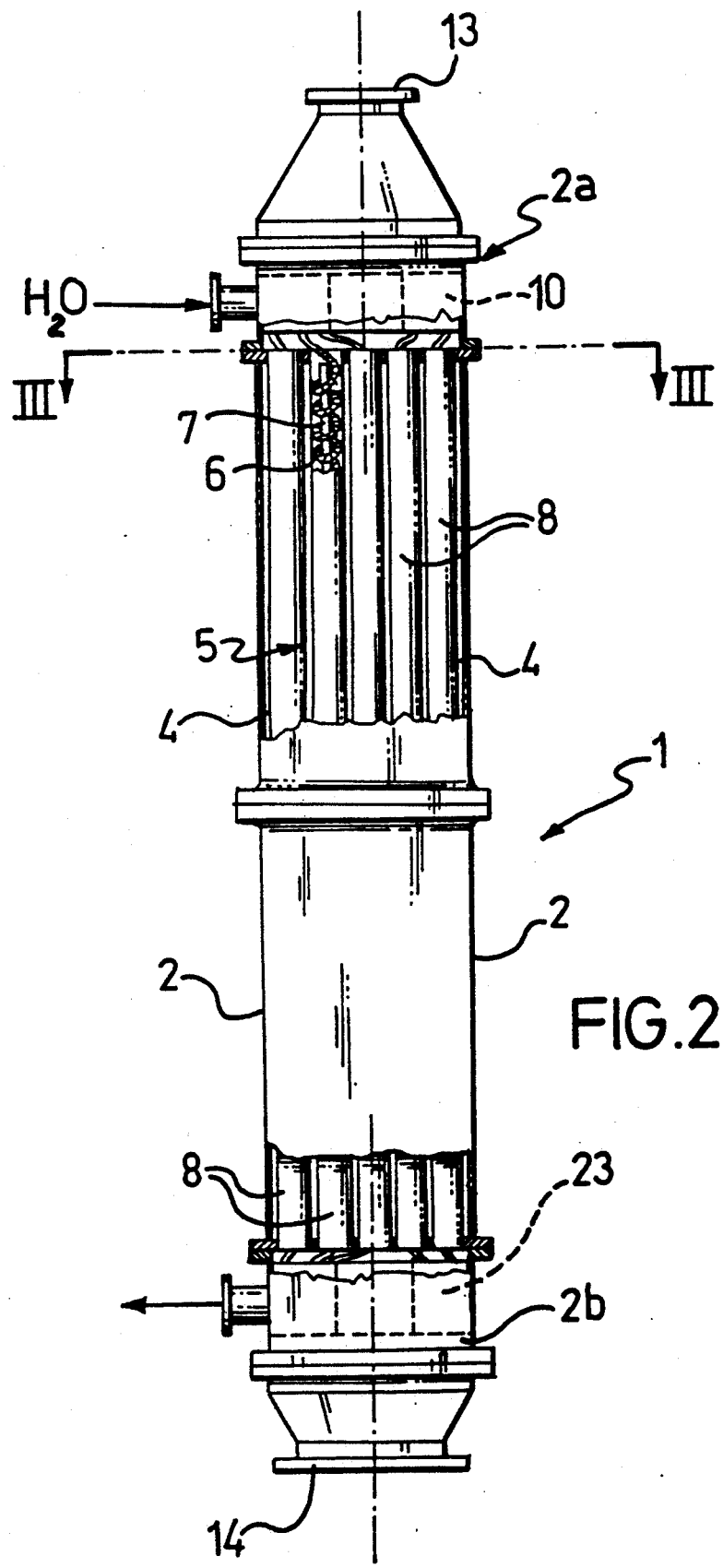
FIG. 2 is a partially-sectioned, front elevational view of the apparatus of FIG. 1.
Figure 3:
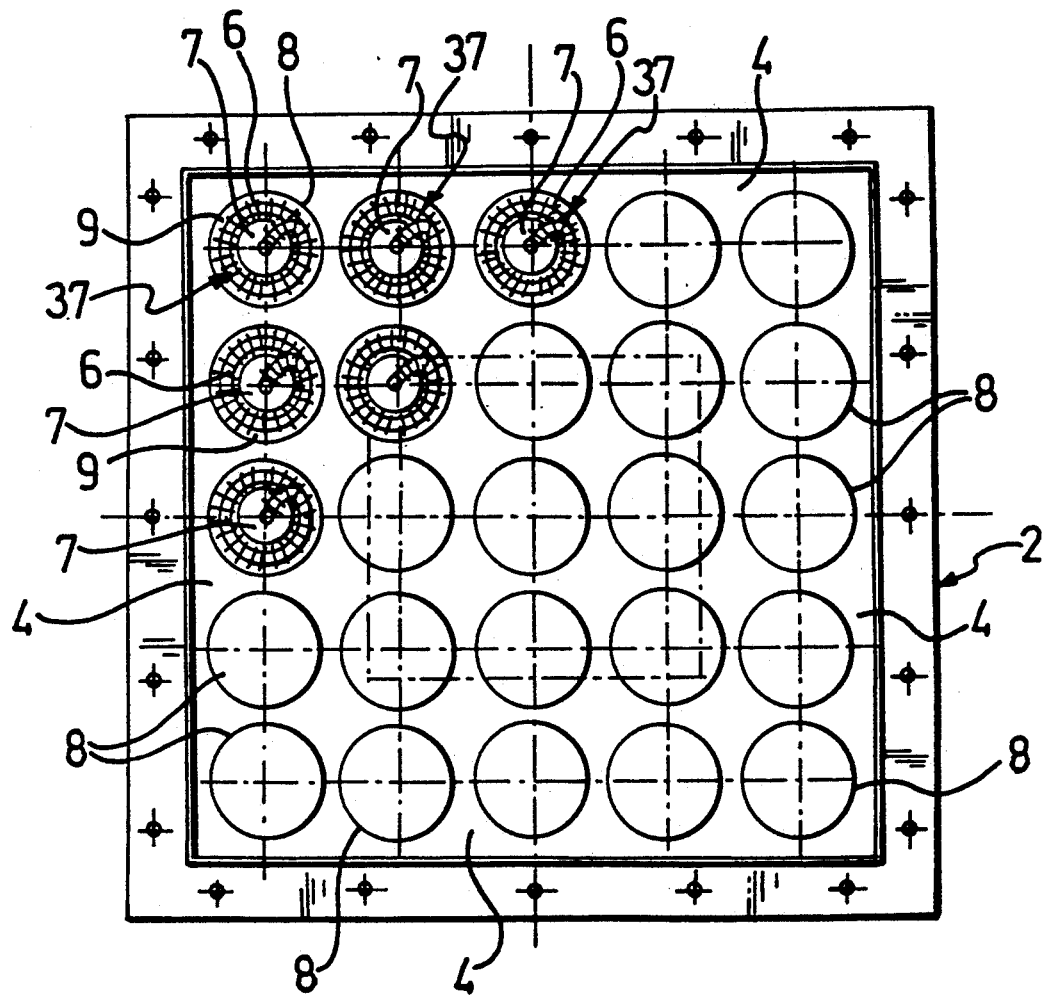
FIG. 3 is a transverse section of the apparatus of FIG. 2 taken on the arrows III—III.
Figure 4:
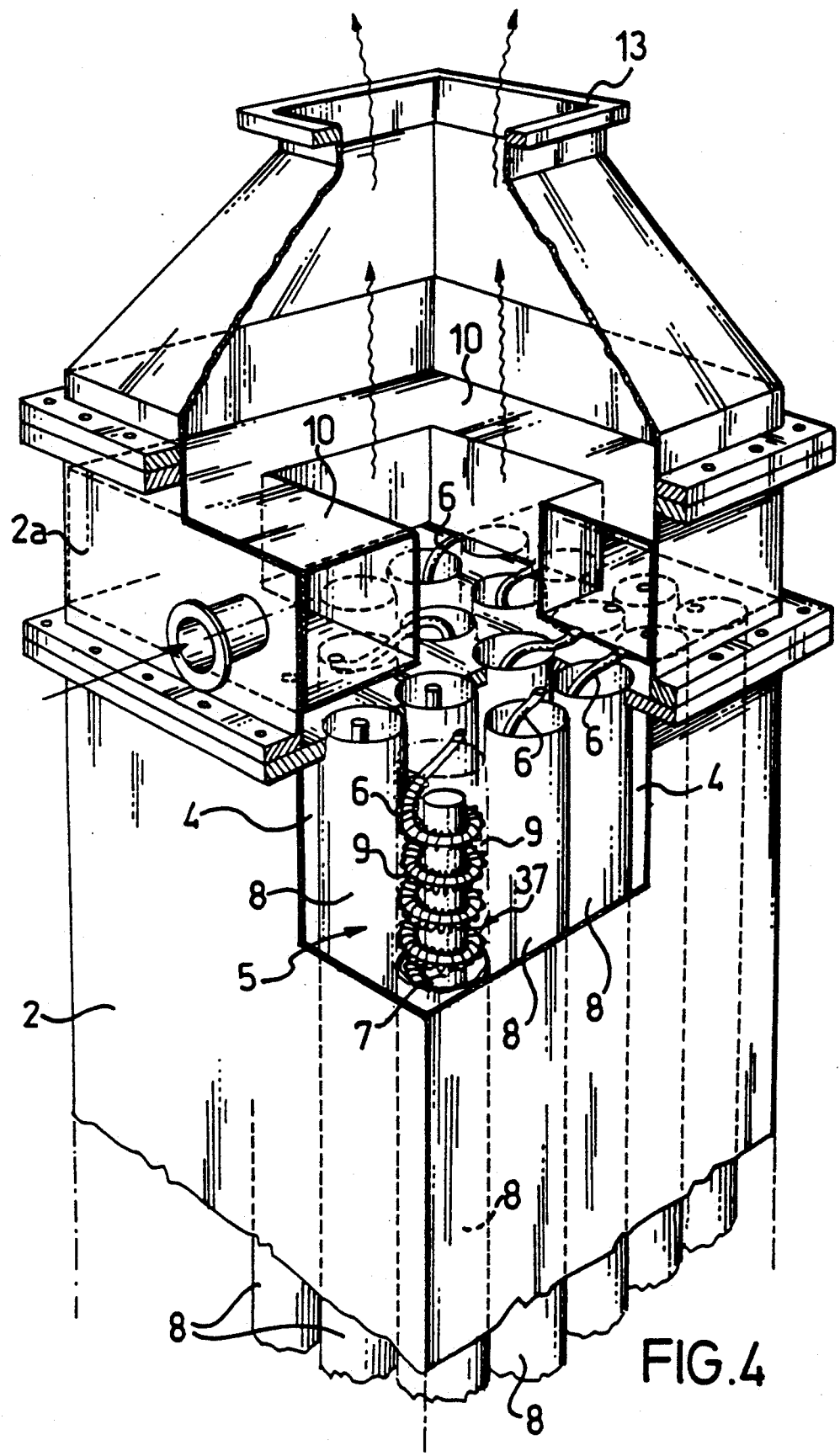
FIG. 4 is a partially-sectioned perspective view showing some details of the apparatus of FIG. 2 on an enlarged scale.

With reference to FIG. 1, this shows schematically a plant for the discontinuous distillation of a binary mixture, including a distillation column generally indicated 1, of the type comprising a vertical-axis tubular body 2 supported by a framework not shown since it is entirely conventional.

Within the tubular body 2 is a chamber 4 for housing a condenser 5 comprising a plurality of finned tubes, all indicated 6, each of which is formed into a spiral around a respect cylindrical core 7, preferably of plastics material.

The finned tubes 6 are housed in respective guide tubes 8 disposed vertically and side by side in the column 1.

Within each guide tube 8 there can thus be identified an annular chamber 9 between the inner wall of the guide tube and the cylindrical core 7 in which each finned tube 6 is located. To advantage, the fins of the tubes 6 constitute a filling, indicated 37, of the column 1.

In this respect it should be noted that each cylindrical core 7, in addition to acting as a support and guide for the finned tube 6, also has the important function of avoiding by-pass of the vapor phase within the spiral defined by each tube.

Thus it is within these annular chambers 9 that the heat and material exchanges between the rising vapor phase and the descending liquid phase occur, as well as the condensation of a proportion of the vapor phase with the creation of the reflux within the column 1.

Each finned tube 6 is connected to a distributor 10 of a suitable coolant fluid, for example water, with which it is in fluid communication.

The distributer 10, constituted essentially by a square-section torus is located at the top end 2a of the tubular body 2 of the column 1.

The finned tubes 6 are also connected to the input of a manifold 23 for the coolant fluid, entirely similar to the distributer 10 and located at the bottom end 2b of the tubular body 2.

The distributor 10 and the manifold 23 are connected by input and output ducts, 11 and 12 respectively, into a conventional external coolant water circuit, not shown.

In accordance with this embodiment of the present invention, the fins of the tubes 6 define a cooled surface within each annular chamber 9 on which the vapor phase rising through the column partially condenses. Thus the descending liquid phase, in countercurrent with the vapor phase, forms a thin layer on the fins constituting the filling 37 of the column 1.

The column 1 is provided at opposite top and bottom ends, 2a and 2b respectively, with apertures 13 and 14 through which it is in fluid communication, through a duct 15, with a condenser 16 for condensing the vapor phase leaving the column itself and, through a duct 17, with a boiler 18 for collecting the liquid phase leaving the column and for re-evaporating a proportion thereof.

Respective ducts for connecting the boiler 18 into a steam distribution network of conventional type, not shown, are indicated 19 and 20.

Respective input and output ducts for coolant water for the condenser 16 are indicated 21 and 22 and are connected to a conventional circuit not shown.

References 24 and 25 indicate respective valves located respectively in the duct 12 and in the duct 27 for the output of the distillate from the condenser 16, the valves being subject to a device 26 for controlling and measuring the temperature detected at the top of the column 1. From the valve 25 extend further ducts 28 and 29 for connection to the boiler 18 and to a collecting reservoir for the distillate not shown.

Figure 5:
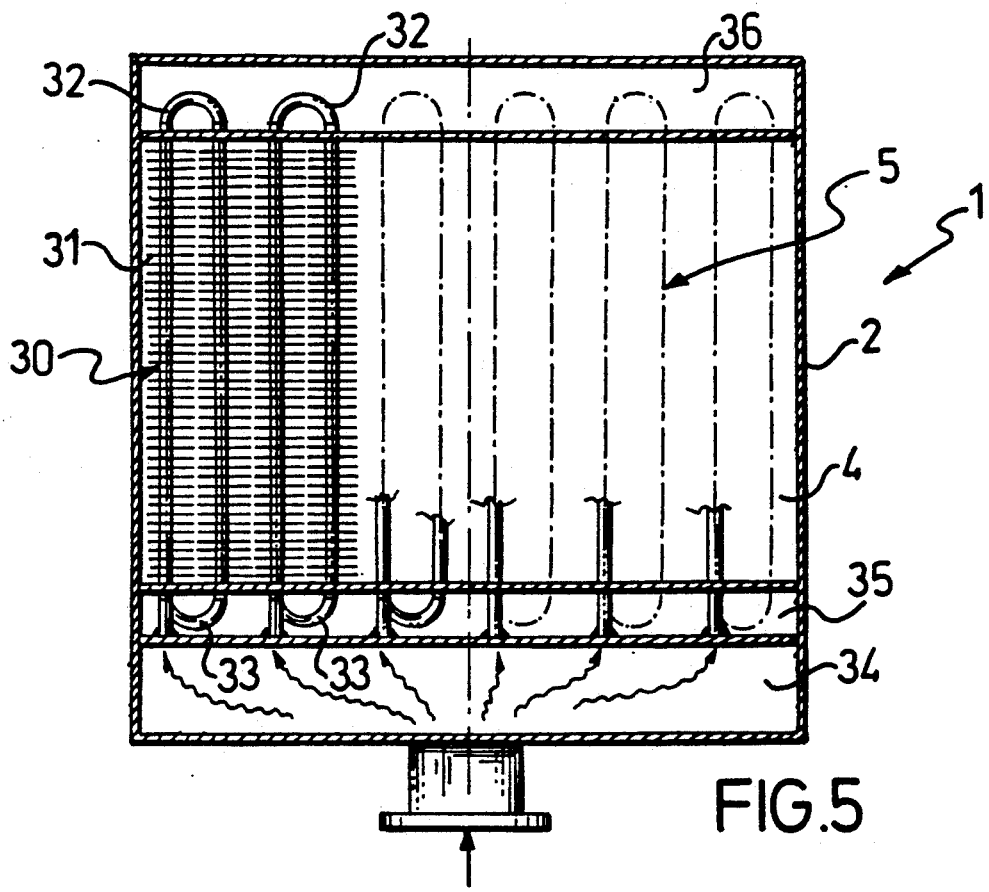
FIGS. 5, 6 and 7 show further structural details of a variant of the apparatus of FIG. 2.
Figure 6:
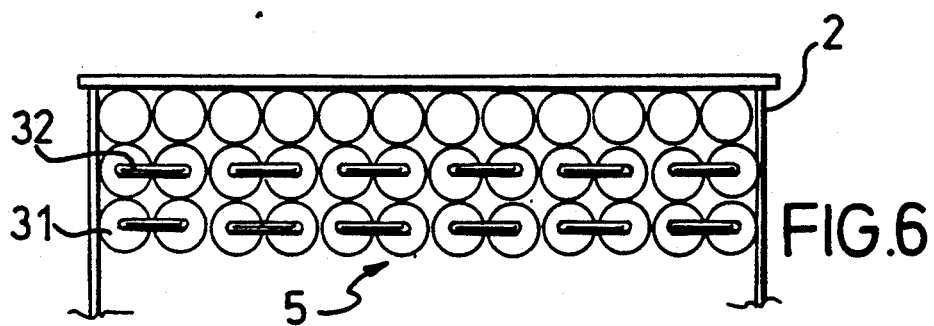
Figure 7:
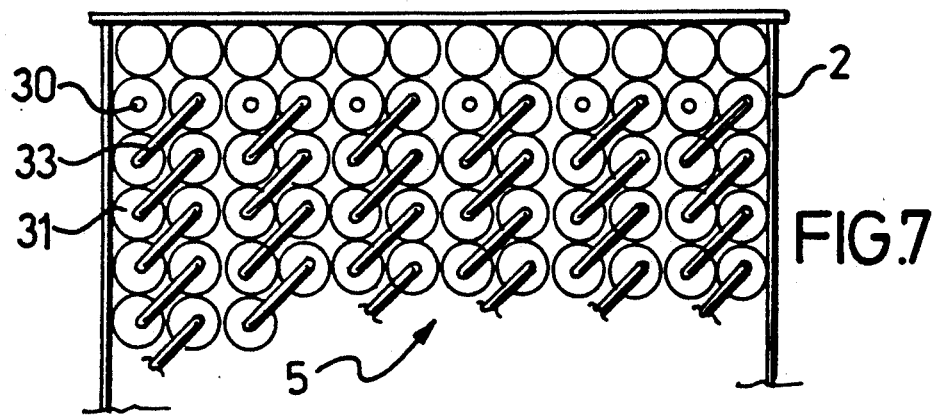

With reference to FIGS. 5 to 7, a second embodiment of the column 1 according to the invention will now be described.

In this embodiment, the condenser 5 includes a plurality of tubes each indicated 30, each having respective finning 31 located adjacent the interior of the tubular body 2.

Each tube 30 defines a series of rectangular turns, each of which is formed by joining two straight sections of the tube by a first U-shaped connector 32. Each turn is connected to a subsequent turn immediately beneath it by a second U-shaped connector 33.

In accordance with this embodiment, it is thus possible to see from FIGS. 5 and 6 that the connectors 32 lie in substantially horizontal planes while the connectors 33 lie in planes inclined at about 45° since these must connect the superposed turns.

Each tube 30 is also connected at its input to a distributor 34 for supplying the coolant fluid arriving through the duct 11.

With reference to FIG. 5, it should be noted that the distributor 34 and the U-shaped connectors 32 and 33 of the tubes 30 are housed in respective chambers 35, 36 defined within the tubular casing 2 by opposing parts of the chamber 4 intended to house the condenser 5.

Also in this second embodiment of the present invention, the filling 37 of the column is to advantage constituted by the very finning 31 of the tubes 30 which also constitutes a cooled surface for the partial condensation of the vapor phase.

With reference to the second embodiment described above, the characteristics of the tubes used for the manufacture of the condenser 5 will be given below by way of example.

| Material: | AISI 304 |
|---|---|
| Tube outer diameter: | ⅜ inch |
| Tube wall thickness: | 1.0–1.5 mm |
| Outer diameter of fins: | 15 mm |
| Number of fins/linear meter: | 250 |
| Tube length: | 400 mm |
| Distance between successive fins: | 6.5 mm |

In accordance with a further variant of the distillation column of the present invention, the filling of the column may be of conventional type, for example constituted by Rashig rings disposed in a random or an orderly arrangement within mesh containers placed at the top and bottom ends, 2a and 2b, of the column.

In this case, the condenser 5 is immersed in the filling 37 and comprises a tube formed into a spiral, of circular or square section, and extending between the opposite top and bottom ends, 2a and 2b, of the column 1.

In this embodiment, the partial condensation of the ascending vapor flow in the column occurs on the walls of the tube and on the cooled filling thereof.

With reference to the distillation plant and apparatus described above, one example of carrying out the distillation method in accordance with the present invention will now be given.

EXAMPLE 1

With the use of the distillation plant shown schematically in FIG. 1 and with the column explained with reference to FIGS. 2 to 4, 300 liters of a mixture comprising 23% methanol and 77% water by weight with respect to the total weight of the mixture were fractionated.

The structural parameters of the column were as follows:

| | |
|---|---|
| Condenser height/filling: | 4 mm |
| Number of turns: | 160 |
| Cross-sectional area of the column | 0.6 dm$^2$ |

The characteristics of the tubes and of the fins were as given in the paragraphs above. The mixture to be fractionated was loaded into the boiler 18 and the distillation column was then started, the boiler 18 being heated by means of steam and the entire distillate leaving the condenser 16 being recirculated to the boiler 18 through the duct 28. The starting phase for the column was followed by means of the control device 26 and, when the temperature of 64.7° C. had been reached at the top of the column, the recycling of the liquid from the condenser 16 to the boiler 18 was stopped and the circulation of the coolant water to the condenser 5 was started simultaneously. These operations were effected by means of the valves 24 and 25.

The main operative variables of the discontinuous distillation are given in Table 1 below.

TABLE 1

| Parameter | Start of Distillation | End of Distillation |
|---|---|---|
| Temperature of coolant water leaving the condenser 5. | 65° C. | 92° C. |
| Temperature of the vapor phase at the top of the column. | 64.7° C. | 64.7° C. |
| Temperature of the coolant water leaving the condenser 16. | 40° C. | 57° C. |
| Temperature of the distillate leaving the condenser 16. | 13° C. | 19.5° C. |
| Temperature of the vapor phase entering at the bottom of the column. | 80° C. | 99° C. |
| Temperature of the steam heating the boiler 18. | 120° C. | 120° C. |
| Mass flow rate of distillate leaving the condenser 16. | 8.8 kg/h | 4.1 kg/h |

At the end of the distillation, the quality and quantity of the distillate (condensate from the top) was checked and the following composition was found:

| | |
|---|---|
| Methanol concentration | 99.5% |
| Karl Fischer | 0.5% |

The recovery yield from the distillation was 98%.

EXAMPLE 2

A second discontinuous distillation test was carried out with the plant shown in FIG. 1, with the use of a column with a condenser/filling height of 6 meters.

As reported in example 1, 300 liters of a mixture comprising 23% by weight of methanol and 77% by weight of water was distilled discontinuously. The parameters for the distillation varied as given below in Table 2.

TABLE 2

| Parameter | Start of Distillation | End of Distillation |
|---|---|---|
| Temperature of coolant water leaving the condenser 5. | 65° C. | 92° C. |
| Temperature of the vapor phase vapor 00 the top of the column. | 64.5° C. | 64.5° C. |
| Temperature of the coolant water leaving the condenser 16. | 40° C. | 57° C. |
| Temperature of the distillate leaving the condenser 16. | 13° C. | 19.5° C. |
| Temperature of the vapor 00 phase entering at the bottom of the column. | 80° C. | 99° C. |
| Temperature of the steam heating the boiler 18. | 120° C. | 120° C. |
| Mass flow rate of distillate leaving the condenser 16. | 12.5 kg/h | 5.9 kg/h |

At the end of the distillation, the quality and quantity of the distillate were checked and it was found that the following results were given:

| | |
|---|---|
| Methanol concentration in the distillate | 99.9% |
| Karl Fisher | 0.1% |

The recovery yield was again 98%.

From what has been explained above, it is clear that the method and the column of the present invention allow the following advantages to be achieved over the prior art:

the obtaining of excellent fractionation with extremely small column volumes, equal to the volumes of the most efficient filled columns while not having the disadvantages of the latter;

limited addition of cooling to the condenser 16 where it is necessary to condense only the final product obtained, the need to return part of the distillate to the column being entirely eliminated;

possibility of recovering the heat removed by the fluid cooling the condenser 5, which is brought to a temperature close to that at the base of the column such as to make it convenient to recover the energy, for example by a heat pump or by means of an absorption cooling unit;

reduction of the section of the column 1 by the progressive condensation within it which reduces the volume of the rising vapor phase, with an advantageous reduction in the velocity of the vapor phase, in the load losses and in the possibility of the column flooding.

Compared with prior-art filled columns of a similar compactness, the column of the present invention also has the advantage of greater rapidity of re-establishment of equilibrium conditions disturbed by any variations, whether qualitative or quantitive, in the supply. This greatly reduces the risk of a distillate leaving the column outside the specific requirements.

It is also clear that the extreme compactness of the distillation column formed in accordance with the present invention enables the investment costs for the column itself and for accessory installations to be reduced considerably. In the preferred embodiments of the column, the use of a random filing which, as is known, must periodically be subject to maintenance, is avoided.

The whole of this is advantageous as regards the costs of production and running of the column which are much lower than those for columns currently on the market.

It should finally be added that the distillation method which is the subject of the present invention may be applied equally advantageously to continuous operations, with the further benefits that result in terms of the economy of the process.

I claim:

1. A method for fractional distillation of a mixture including at least tow compounds with different boiling points comprising the steps of:
   bringing into contact a rising flow of vapor of the mixture and a descending flow of liquid of the mixture in a column including a packing, obtaining the liquid flow from within the column itself by partially condensing the vapor flow by heat exchange with a cooled surface of a condenser which extends throughout the packing and obtaining the rising flow of vapor by heating the mixture in a boiler located at the base of the column,
   controlling the liquid-vapor equilibrium conditions in each section of the column, from the exterior, by introducing a coolant fluid into the condenser through a conduit in countercurrent with the rising flow of vapor in the column and by measuring and controlling the temperature at the top of the column.

2. A method according to claim 1, further comprising the step of fully condensing the vapor flow leaving the column.

3. A distillation column for fractional distillation of a mixture including at least two compounds with different boiling points comprising:
   a tubular member having a top end and a bottom end at opposite ends and including a packing,
   a boiler in fluid communication with the bottom end,
   a condenser extending throughout the entire length of the packing provided with input and output pipes for the circulation of coolant fluid located at the top end and at the bottom end of the column respectively,
   means for controlling the liquid vapor equilibrium conditions in each section of the column by a valve located in the output pipe and by a device for measuring and controlling the temperature detected at the top of the column.

4. A distillation column according to claim 3, wherein the condenser comprises at least one tube for the circulation of the coolant fluid, formed into a spiral within the column.

5. A distillation column according to claim 3, wherein the condenser includes a plurality of finned tubes each formed into a vertical spiral on a corresponding cylindrical core, the fins constituting the packing of the column.

6. A distillation column according to claim 5, wherein each of the finned tubes is housed in a respective guide tube.

7. A distillation column according to claim 3, wherein the condenser includes a plurality of tubes with respective finning disposed horizontally in the tubular body and defining a series of rectangular spirals disposed side by side with the finning constituting the packing of the column.

* * * * *